C. D. GROVE.
RECOVERING VALUABLE METALS AND MINERALS FROM STREAM BEDS.
APPLICATION FILED SEPT. 27, 1910.
1,008,539.
Patented Nov. 14, 1911.
3 SHEETS—SHEET 1.
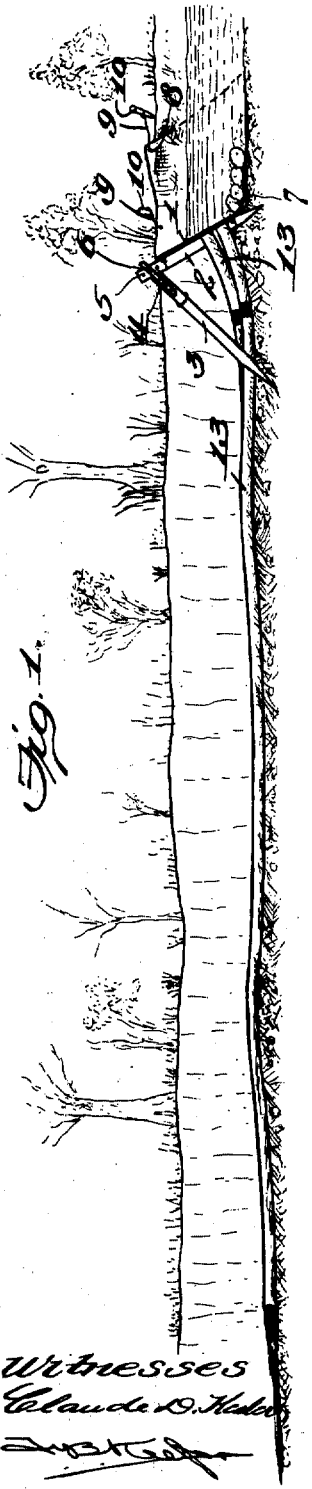
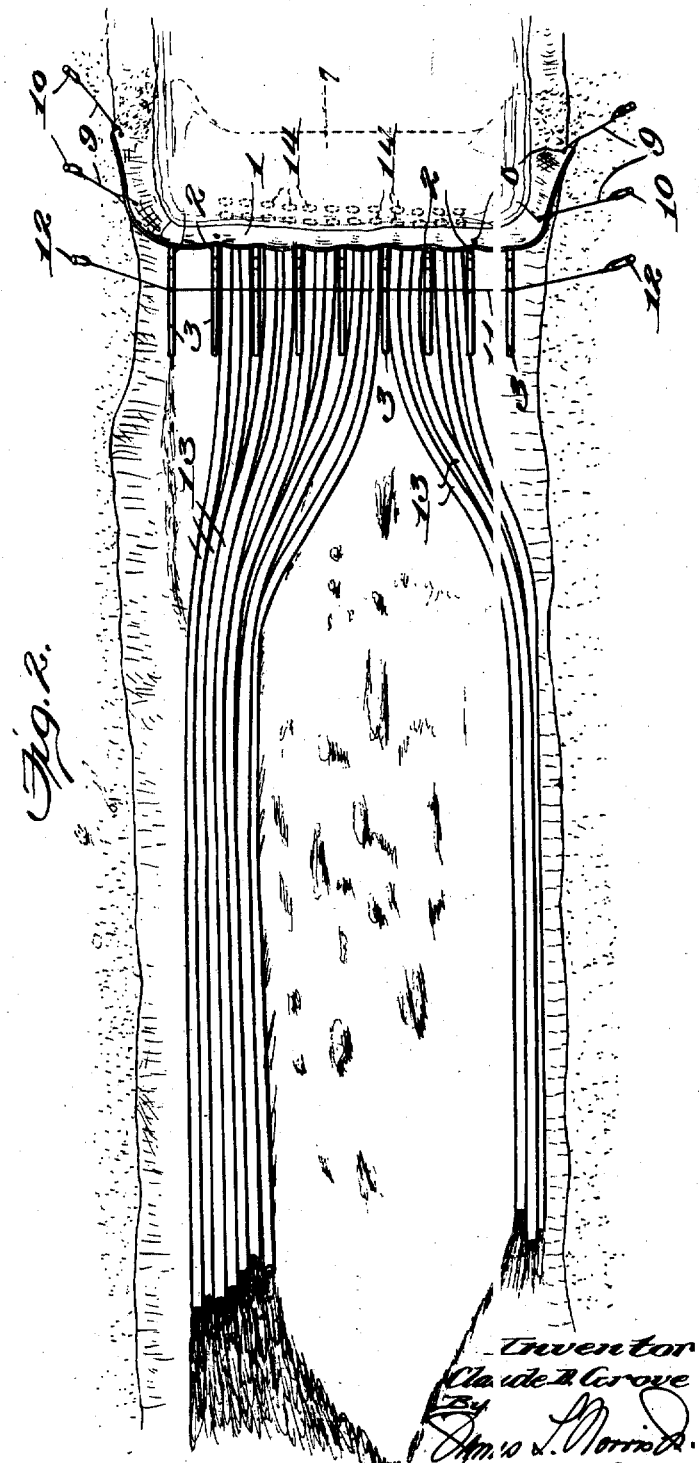

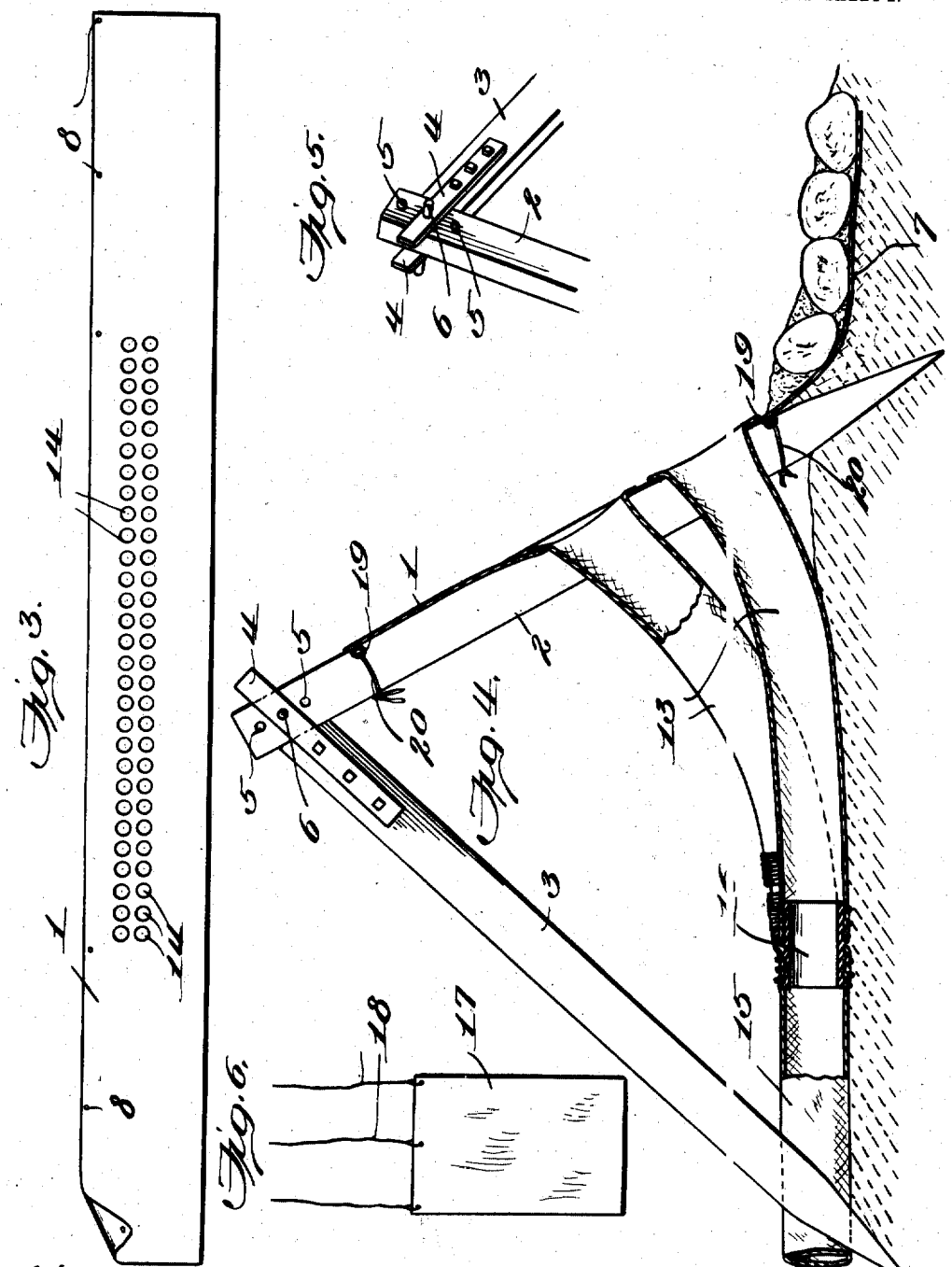

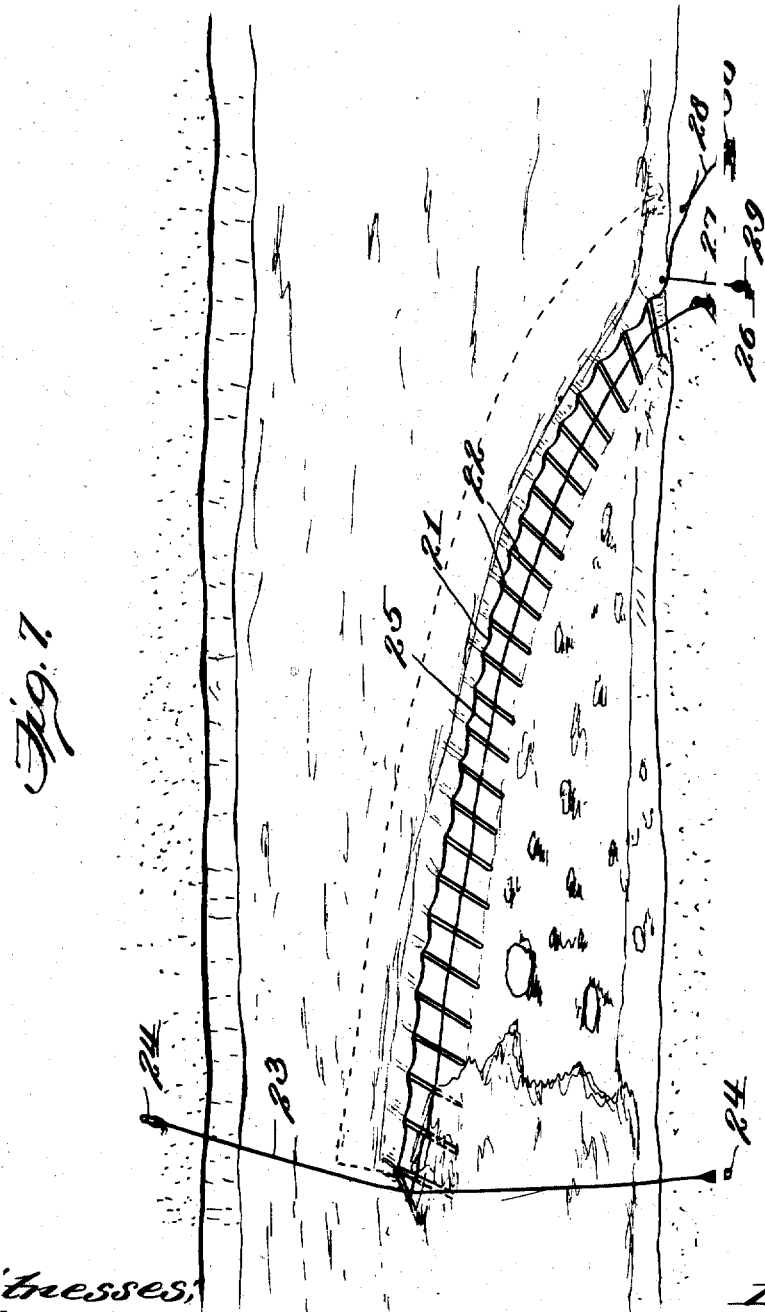

UNITED STATES PATENT OFFICE.

CLAUDE D. GROVE, OF JEFFERSON CITY, MISSOURI.

RECOVERING VALUABLE METALS AND MINERALS FROM STREAM-BEDS.

1,008,539. Specification of Letters Patent. Patented Nov. 14, 1911.

Application filed September 27, 1910. Serial No. 584,084.

*To all whom it may concern:*

Be it known that I, CLAUDE D. GROVE, a citizen of the United States, residing at Jefferson City, in the county of Cole and State of Missouri, have invented new and useful Improvements in Recovering Valuable Metals and Minerals from Stream-Beds, of which the following is a specification.

My present invention relates to improvements in the art of recovering gold and other valuable metals and minerals from beds of streams and from adjacent flooded areas, and it has for its object primarily to provide simple and efficient apparatus whereby the flow of water in the stream may be so controlled as to uncover or expose the bed thereof and thus permit the metals or minerals to be readily recovered, the preferred embodiment of the invention embodying a portable dam composed of flexible or pliable material together with suitable devices whereby it may be readily placed and secured in position, and hose are connected to the dam and serve to conduct the water in the stream around or beyond the area in the bed of the stream which is to be exposed.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is a diagrammatic view of a stream showing an apparatus constructed in accordance with my present invention; Fig. 2 is a plan view of the apparatus as shown in Fig. 1, the same being also illustrated as applied to a stream; Fig. 3 is a detail view of the flexible dam; Fig. 4 represents an enlarged sectional view through the dam, the hose connected thereto, and the supporting stakes or braces; Fig. 5 is a detail perspective view of a device for connecting the tops of the stakes or braces; Fig. 6 is a detail view of a covering device which may be used to cut off the passage of the water from the upper side of the dam into the hose; and Fig. 7 is a plan view of a dam embodying my invention which is adapted for use upon streams in which the volume of water is too great to be conducted by the hose, as shown in the preceding figures.

Similar parts are designated by the same reference characters in the several views.

In the accompanying drawing, I have shown certain embodiments of the invention which are the forms usually preferred. It will be understood, however, that these forms of the invention are illustrated essentially as examples, as various modifications and changes may be made in order that the invention may be applied to the best advantage according to the circumstances of each particular case, and such modifications or changes are to be included in the scope of the claims.

In the present instance, the apparatus includes a dam which is composed of a strip or sheet of pliable or flexible material 1 which is substantially watertight. Canvas or other material sufficiently strong to withstand the pressure of the water may be used in which the material is woven sufficiently close to prevent any substantial leakage of water through the material. This strip is of sufficient length to extend across the stream and is provided with suitable means for securing it in place. It is preferable to employ a set of stakes 2 the lower ends of which may be sharpened or otherwise adapted to be driven into the bed of the stream for the purpose of anchoring the stakes, and these stakes 2 when placed are inclined down-stream. A second set of stakes 3 are also provided, the lower ends of these stakes being preferably sharpened and they are preferably driven or otherwise anchored in the bed of the stream and inclined up-stream. The stakes 2 and 3 are arranged in pairs and the upper portions of each pair of stakes are detachably connected in any suitable way. In the present instance, I provide the upper end of each stake 3 with a pair of straps 4 which may be bolted or otherwise secured to the opposite sides of the stake 3, and the upper portion of the stake 2 is provided with suitable number of openings 5, the straps 4 receiving the upper portion of the stake 2 between them and a pin or bolt 6 may pass through apertures in the straps 4 and through one of the openings 5 in the stake 2, the stakes 2 and 3 when thus united forming a rigid and substantial brace. The stakes 2 and 3 are placed at suitable intervals across the bed of the stream and the strip 1 of flexible or pliable material is stretched across the up-stream sides of the stakes 2. This strip is preferably of such a width as to permit its lower edge to extend beyond the dam and form an apron 7 which lies closely upon the bed of the stream in advance of the dam, and rock or other material may be piled upon this apron portion of the strip for the purpose not only of anchoring it firmly in position, but also maintaining the strip in close contact with the bed of the stream and thereby prevent the leakage of water beneath the dam. The ends of the strip 1 at the two banks of the stream are preferably extended up-stream for a suitable distance so that they may effectually cut off the passage of water at these points. The ends of the strip may be provided for this purpose with eyes or rings 8 and ropes or cables 9 may be attached to these eyes or rings and secured by stakes 10, these stakes and ropes also serving to sustain to a considerable degree the pressure of the water acting upon the dam. The braces made up of the stakes 2 and 3 may also be firmly secured from tilting by a rope 11 which in the present instance is passed around or otherwise suitably secured to the stakes 3 so as to maintain these stakes at appropriately spaced intervals, and the ends of the rope 11 are secured by stakes or other suitable devices 12.

A dam such as that described will serve to prevent the water in the stream from flowing below the dam, and suitable means may be provided for conducting the water around that area in the bed of the stream which is to be worked. In some cases, a flume may be used to conduct the water around such area. In the present instance, however, I have shown the dam equipped with means which is generally preferable and whereby any desired portion of the bed of the stream may be exposed to permit the recovery of the metals or minerals, such means consisting in the present instance of a suitable number of hose 13 which may be of a capacity to conduct the amount of water flowing in the stream and such hose communicate with openings 14 formed in the strip 1. In the present instance the hose is shown sewed to the strip 1 and the inlets of the hose are slightly flared so as to increase the diameter of the mouths of the hose. To facilitate transportation and handling of the apparatus, the hose sections 13 which are attached to the strip 1 may be relatively short, and one or more hose sections 15 may be attached to the hose sections 13 by couplings 16 or other suitable means, the hose being of a length sufficient to conduct the water in the stream to a point beyond the area to be worked. The hose may also be provided with any suitable form of valve for controlling the flow of water therethrough although the flow of the water through the hose may be conveniently controlled by simply lifting the outlet of the hose above the level of the water on the up-stream side of the dam.

In Fig. 6 I show a convenient means for cutting off the flow of water into the hose while the hose are being coupled or otherwise manipulated. This device consists of a section of canvas or other flexible waterproof material 17 which may be provided with cords 18 and by applying this device to the upper side of the strip 1 so as to cover the inlets of the hose to be cut off, the water will be prevented from entering such hose. The strip 1 may be secured to the braces in any suitable way, rings 19 being attached to the strip in the present instance and cords 20 serve to secure the strip to the braces. According to the present invention any desired area in the bed of the stream may be uncovered and worked for its metal and mineral values, the hose being so laid as to clear the area to be worked and by shifting the hose, the different parts of the stream bed can be exposed. The apparatus which I provide is comparatively light and its nature is such that it may be readily packed and transported over mountainous countries which would be inaccessible to the ordinary machinery for building dams of the ordinary construction. The apparatus may also be quickly put in place and it may be quickly removed if endangered by a freshet. The apparatus may also be conveniently moved from place to place as the working of the stream bed progresses.

In some instances, the volume of water in the stream may be too great to enable the hose as shown in the preceding figure to accommodate it, and when the fall of the stream is sufficiently great, a dam, such as shown in Fig. 7, may be employed advantageously. In this instance the dam embodies a canvas or other flexible watertight sheet 21 which may be similar to the sheet 1 shown in Fig. 3 except that the perforations may be omitted. This sheet is stretched along the up-stream side of a row of supports 22 which are preferably made up of the inclined stakes 2 and 3 as shown in the preceding views. These supports, however, instead of extending entirely across the stream extend at an angle from one bank of the stream and in a direction outwardly and down stream so as to divert a portion of the stream and uncover the bed of the stream behind the dam. The down-stream end of the dam may be anchored in any suitable manner such for instance as by the cable 23 and stakes 24. The supports may be maintained in proper upright relation by the cable 25 which is securely anchored to the stake 26 at the up-stream end of the dam, and the sheet 21 at the up-stream end of the dam may be secured by the ropes or cables 27 and 28 which are attached to the stakes 29 and 30 respectively.

I claim as my invention:
1. An apparatus for use in the recovery of valuable metals or minerals from the beds of streams or adjacent areas flooded by such streams, comprising a dam composed of a strip of pliable substantially watertight material extending transversely of the stream and having its upper edge tensioned, and a set of independently placed and separately constructed supports for maintaining such strip in proper position whereby the flow of the stream is diverted and the area to be worked is exposed.

2. In an apparatus of the character described, a dam embodying a strip of pliable substantially watertight material extended transversely of a stream, and a set of separate independently placed supports spaced longitudinally of said strip and having means for attaching them to said strip.

3. In an apparatus of the character described, a dam embodying a strip of pliable substantially watertight material, a set of independently placed braces for supporting said strip transversely of a stream, and means for conveying the water of the stream from the up-stream side of said strip to a point below the portion of the stream to be worked.

4. In an apparatus of the character described, a dam embodying a strip of pliable watertight material having openings therein for the passage of water, a plurality of independently placed means for supporting said strip to extend transversely of a stream, and hose connected to said strip to receive the water flowing through the openings therein and conduct it beyond a portion of the stream bed.

5. In an apparatus of the character described, a dam embodying a strip of pliable material, a set of supports spaced longitudinally of said strip, said supports being composed of stakes adapted to be anchored in the ground, means for securing the upper and lower portions of the strip to said supports, means for sustaining a tension upon the upper edge of the strip, and means connecting the upper portions of said supports and operative to maintain them in proper spaced relation.

6. In an apparatus of the class described, the combination of a strip of watertight flexible material, a plurality of supports spaced longitudinally of the strip, anchoring means for the strip operative to sustain a tension thereon, and anchoring means for said supports operative to maintain the latter in proper spaced relation.

7. An apparatus for use in the recovery of valuable metals or minerals from the beds of streams comprising a dam composed of a strip of pliable material extending transversely of the stream and having openings therein, hose connected to said strip to receive the water flowing through the openings therein and conduct it beyond a portion of the stream bed, and means for closing certain openings in the strip to cut off the flow of water through the corresponding hose.

8. Apparatus for use in the recovery of valuable metals or minerals from the beds of streams of adjacent areas comprising a dam composed of a strip of pliable material having openings therein for the passage of water, hose connected to said strip to receive water flowing through the openings therein, and a section of flexible material adapted to cover certain openings in said strip to cut off the flow of water through the corresponding hose.

In testimony whereof I have hereunto set my hand in presence of two subscribing witnesses.

CLAUDE D. GROVE.

Witnesses:
 GUY E. KELLY,
 C. SMITH.

---

Copies of this patent may be obtained for five cents each, by addressing the "Commissioner of Patents, Washington, D. C."